(12) United States Patent
Kwan et al.

(10) Patent No.: US 7,735,114 B2
(45) Date of Patent: *Jun. 8, 2010

(54) MULTIPLE TIERED NETWORK SECURITY SYSTEM, METHOD AND APPARATUS USING DYNAMIC USER POLICY ASSIGNMENT

(75) Inventors: Philip Kwan, San Jose, CA (US); Chi-Jui Ho, Campbell, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 861 days.

This patent is subject to a terminal disclaimer.

(21) Appl. No.: 10/654,417

(22) Filed: Sep. 4, 2003

(65) Prior Publication Data

US 2005/0055570 A1    Mar. 10, 2005

(51) Int. Cl.
*H04L 9/00* (2006.01)
(52) U.S. Cl. .................. 726/1; 726/2; 726/3; 726/4; 726/13; 726/14; 713/151; 713/153; 713/168; 709/225; 709/229; 455/410; 455/411
(58) Field of Classification Search .................. 713/153, 713/160, 168; 726/11, 12, 13, 15, 6, 1, 2, 726/4, 26; 709/225, 227, 249, 229, 232
See application file for complete search history.

(56) References Cited

U.S. PATENT DOCUMENTS

| | | |
|---|---|---|
| 4,897,874 A | 1/1990 | Lidinsky et al. |
| 5,237,614 A | 8/1993 | Weiss et al. |
| 5,721,780 A | 2/1998 | Ensor et al. |
| 5,757,924 A | 5/1998 | Friedman et al. |
| 5,774,551 A | 6/1998 | Wu et al. |
| 5,812,819 A | 9/1998 | Rodwin et al. |
| 5,825,890 A | 10/1998 | Elgamal et al. |
| 5,892,903 A | 4/1999 | Klaus |
| 5,894,479 A | 4/1999 | Mohammed |

(Continued)

OTHER PUBLICATIONS

Hayes et al, Authenticated VLANs: Secure Network Access at Layer 2, Alcatel Telecommunication Riview, pp. 28-286, 2002.*

(Continued)

*Primary Examiner*—Nasser Moazzami
*Assistant Examiner*—Shanto M Abedin
(74) *Attorney, Agent, or Firm*—Nixon Peabody LLP; John P. Schaub

(57) ABSTRACT

A multiple key, multiple tiered network security system, method and apparatus provides at least three levels of security. The first level of security includes physical (MAC) address authentication of a user device being attached to the network, such as a user device being attached to a port of a network access device. The second level includes authentication of the user of the user device, such as user authentication in accordance with the IEEE 802.1x standard. The third level includes dynamic assignment of a user policy to the port based on the identity of the user, wherein the user policy is used to selectively control access to the port. The user policy may identify or include an access control list (ACL) or MAC address filter. Also, the user policy is not dynamically assigned if insufficient system resources are available to do so. Failure to pass a lower security level results in a denial of access to subsequent levels of authentication.

49 Claims, 6 Drawing Sheets

U.S. PATENT DOCUMENTS

| | | | |
|---|---|---|---|
| 5,946,308 A * | 8/1999 | Dobbins et al. | 370/392 |
| 5,958,053 A | 9/1999 | Denker | |
| 5,974,463 A | 10/1999 | Warrier et al. | |
| 6,021,495 A | 2/2000 | Jain et al. | |
| 6,115,376 A | 9/2000 | Sherer et al. | |
| 6,167,052 A * | 12/2000 | McNeill et al. | 370/399 |
| 6,167,445 A * | 12/2000 | Gai et al. | 709/223 |
| 6,212,191 B1 | 4/2001 | Alexander et al. | |
| 6,219,790 B1 | 4/2001 | Lloyd et al. | |
| 6,339,830 B1 | 1/2002 | See et al. | |
| 6,363,489 B1 | 3/2002 | Comay et al. | |
| 6,393,484 B1 * | 5/2002 | Massarani | 709/227 |
| 6,496,502 B1 * | 12/2002 | Fite et al. | 370/389 |
| 6,510,236 B1 | 1/2003 | Crane et al. | |
| 6,519,646 B1 | 2/2003 | Gupta et al. | |
| 6,553,028 B1 * | 4/2003 | Tang et al. | 370/389 |
| 6,615,264 B1 | 9/2003 | Stoltz et al. | |
| 6,651,168 B1 | 11/2003 | Kao | |
| 6,728,246 B1 * | 4/2004 | Egbert et al. | 370/392 |
| 6,732,270 B1 | 5/2004 | Patzer et al. | |
| 6,775,290 B1 * | 8/2004 | Merchant et al. | 370/395.53 |
| 6,789,118 B1 * | 9/2004 | Rao | 709/225 |
| 6,807,179 B1 * | 10/2004 | Kanuri et al. | 370/395.31 |
| 6,853,988 B1 | 2/2005 | Dickinson et al. | |
| 6,874,090 B2 * | 3/2005 | See et al. | 726/13 |
| 6,892,309 B2 * | 5/2005 | Richmond et al. | 726/7 |
| 6,912,592 B2 * | 6/2005 | Yip | 709/249 |
| 6,950,628 B1 * | 9/2005 | Meier et al. | 455/41.2 |
| 6,959,336 B2 | 10/2005 | Moreh et al. | |
| 6,981,054 B1 * | 12/2005 | Krishna | 709/235 |
| 7,028,098 B2 * | 4/2006 | Mate et al. | 709/238 |
| 7,032,241 B1 | 4/2006 | Venkatachary et al. | |
| 7,062,566 B2 * | 6/2006 | Amara et al. | 709/229 |
| 7,079,537 B1 * | 7/2006 | Kanuri et al. | 370/392 |
| 7,093,280 B2 * | 8/2006 | Ke et al. | 726/3 |
| 7,113,479 B2 * | 9/2006 | Wong | 370/235 |
| 7,188,364 B2 * | 3/2007 | Volpano | 726/15 |
| 7,194,554 B1 * | 3/2007 | Short et al. | 709/246 |
| 7,216,229 B2 | 5/2007 | Hu | |
| 7,249,374 B1 * | 7/2007 | Lear et al. | 726/6 |
| 7,302,700 B2 * | 11/2007 | Mao et al. | 726/11 |
| 7,360,086 B1 * | 4/2008 | Tsuchiya et al. | 713/168 |
| 7,523,485 B1 * | 4/2009 | Kwan | 726/2 |
| 7,529,933 B2 | 5/2009 | Palekar | |
| 7,536,464 B1 * | 5/2009 | Dommety et al. | 709/228 |
| 7,562,390 B1 * | 7/2009 | Kwan | 726/23 |
| 7,567,510 B2 * | 7/2009 | Gai et al. | 370/230 |
| 7,596,101 B2 | 9/2009 | Oguchi | |
| 2002/0016858 A1 * | 2/2002 | Sawada et al. | 709/238 |
| 2002/0133534 A1 * | 9/2002 | Forslow | 709/200 |
| 2002/0146002 A1 * | 10/2002 | Sato | 370/386 |
| 2003/0028808 A1 * | 2/2003 | Kameda | 713/201 |
| 2003/0037163 A1 * | 2/2003 | Kitada et al. | 709/236 |
| 2003/0046391 A1 | 3/2003 | Moreh et al. | |
| 2003/0051041 A1 | 3/2003 | Kalavade et al. | |
| 2003/0056063 A1 * | 3/2003 | Hochmuth et al. | 711/152 |
| 2003/0065944 A1 * | 4/2003 | Mao et al. | 713/201 |
| 2003/0067874 A1 * | 4/2003 | See et al. | 370/230.1 |
| 2003/0105881 A1 * | 6/2003 | Symons et al. | 709/249 |
| 2003/0142680 A1 | 7/2003 | Oguchi | |
| 2003/0217151 A1 | 11/2003 | Roese et al. | 709/225 |
| 2003/0226017 A1 | 12/2003 | Palekar et al. | |
| 2004/0053601 A1 * | 3/2004 | Frank et al. | 455/411 |
| 2004/0160903 A1 * | 8/2004 | Gai et al. | 370/254 |
| 2004/0255154 A1 * | 12/2004 | Kwan et al. | 713/201 |
| 2005/0025125 A1 | 2/2005 | Kwan | |
| 2005/0055570 A1 | 3/2005 | Kwan et al. | |
| 2005/0091313 A1 * | 4/2005 | Zhou et al. | 709/204 |
| 2005/0185626 A1 | 8/2005 | Meier et al. | |
| 2007/0220596 A1 | 9/2007 | Keeler et al. | |

OTHER PUBLICATIONS

S. Schmid et al, An Access Control Architecture for Microcellular Wireless IPv6 Networks, IEEE, 2001.*

Michele wright, "Using Policies for Effective Network Management", International Journal of Network Management, pp. 1-8, John Wiley & Sons, Ltd., 1999.*

Peter J. Welcher, "Switching: MultiLayer Switching", pp. 1-9, 1999.*

Cisco Systems, Inc., Chapter 9, Configuring 802.1X Port-Based Authentication, Catalyst 3550 Multilayer Switch Software Configuration Guide, Cisco IOS Release 12.1(13) EA1, Mar. 2003, pp. 1-18.

Cisco Systems, Inc., Chapter 20, "Configuring Port-Based Traffic Control", Catalyst 3550 Multilayer Switch Software Configuration Guide, Cisco IOS Release 12.1(13) EA1, Mar. 2003, pp. 1-14.

Cisco Systems, Inc., Chapter 27, "Configuring Network Security with ACLs", Catalyst 3550 Multilayer Switch Software Configuration Guide, Cisco IOS Release 12.1(13) EA1, Mar. 2003, pp. 1-48.

The Institute of Electrical and Electronics Engineers, Inc., "Port-Based Network Access Control", 2001, pp. 1-134.

Congdon, P. et al., "IEEE 802.1X Remote Authentication Dian in User Service (RADIUS) Usage Guidelines," The Internet Society, 2003, 30 pages, obtained from http://www.faqs.org/ftp/rfc/pdf/rfc3580.txt.pdf.

Hayes et al., Authenticated VLANs: Secure Network Access at Layer 2, Alcatel Telecommunications Review, 2002, pp. 28-286.

Copending application U.S. Appl. No. 10/458,628, filed Jun. 11, 2003, entitled: "Multiple Tiered Network Security System, Method and Apparatus".

Office Action issued by USPTO in copending U.S. Appl. No. 10/458,628 dated Jun. 1, 2007.

Copending U.S. Appl. No. 10/631,898, filed Aug. 1, 2003, entitled: "System, Method and Apparatus For Providing Multiple Access Modes In A Data Communications Network".

Office Action issued by USPTO in copending U.S. Appl. No. 10/631,898 dated Jul. 24, 2007.

Microsoft, "Recommendations for IEEE 801.11 Access Points," Apr. 2, 2002, pp. 1-12, obtained from http://www.microsoft.com/whdc/device/network/802x/AccessPts.mspx.

Office Action issued by USPTO in copending U.S. Appl. No. 10/458,628 dated Nov. 30, 2007.

Alcatel Internetworking, Inc., "Authenticated VLANs: Secure Network Access at Layer 2," An Alcatel White Paper, Nov. 2002, pp. 1-14.

http://www.anml.iu.edu/PDF/Automatic_Spoof_Detector.pdf, entitled "Automatic Spoof Detector (aka Spoofwatch)," dated Jan. 28, 2002, printed Jul. 23, 2003, 2 pages in length.

http://www.cert.org/incident_notes/IN-2000-04.html, entitled "CERT® Incident Note IN-2000-04 (Denial of Service Attacks Using Nameservers)," printed Jul. 23, 2003, 3 pages in length.

http://www.cisco.com/en/US/products/hw/switches/ps574/products_configuration_guide_chapter09186a008007ef90.html#xtocid3 (PDF & web pages), entitled "Cisco Catalyst 1900 Series Switches," printed Jul. 29, 2003, 13 pages in length.

http://www.cisco.com/en/US/products/sw/iosswrel/;s1839/products_feature_guide09186a00801543c8.html#1027177 (PDF & web pages), entitled "Cisco IOS Software Releases 12.2T," printed Jul. 29, 2003, 12 pages in length.

http:www.cisco.com/en/US/tech/tk648/tk361/technologies_tech_note09186a0080094adb.shtml (PDF & web pages), entitled "IP Addressing Services," printed Jul. 29, 2003, 10 pages in length.

http://www.cisco.com/en/US/tech/tk86/tk803/technologies_tech_note09186a00800a7828.shtml (PDF & web pages), entitled "Cisco-Cable Source-Verify and IP Address Security," printed Jul. 23, 2003, 25 pages in length.

http://www.extremenetworks.com/libraries/prodpdfs/products/ex_ware_tech_brief.pdf (Extreme Networks PDF), entitled "Tech Brief ExtremeWare 6.2," printed Jul. 29, 2003, 8 pages in length.

http://www.extremenetworks.com/libraries/prodpdfs/products/UnifiedWireless.asp (Extreme Networks PDF & web pages), entitled: Unified Access Architecture for Wired and Wireless Networks, printed Jul. 29, 2003, 10 pages in length.

http://www.legions.org/kv/kv7.txt, entitled "Keen Veracity Legions of the Underground Issue #[7],:" printed Jun. 24, 2003, pp. 1-41.

http://www.linuxgazette.com/issue63/sharma.html, entitled "IP Spoofing," printed Jul. 23, 2003, e pages in length.

http://www.networkcommand.com/docs/ipspooftxt, entitled "[IP-spoofing Demystified] (Trust-Relationship Exploitation)," Jun. 1996, printed May 18, 2003, pp. 1-9.

http://www.sans.org/rr/threats/spoofed/php (PDF and web pages), entitled Spoofed IP Address Distributed Denial of Service Attacks: Defense-in-Depth, printed Jul. 23, 2003, 7 pages in length.

Office Action issued in USPTO in copending U.S. Appl. No. 10/631,898 dated Dec. 18, 2009.

Office Action issued in USPTO in copending U.S. Appl. No. 10/631,898 dated Apr. 28, 2009.

Office Action issued in USPTO in copending U.S. Appl. No. 10/631,898 dated Sep. 4, 2008.

Office Action issued in USPTO in copending U.S. Appl. No. 10/631,898 dated Feb. 20, 2008.

Office Action issued in USPTO in copending U.S. Appl. No. 10/925,155 dated Apr. 14, 2009.

Office Action issued in USPTO in copending U.S. Appl. No. 10/925,155 dated Oct. 27, 2008.

Office Action issued in USPTO in copending U.S. Appl. No. 10/925,155 dated Mar. 20, 2008.

Office Action issued in USPTO in copending U.S. Appl. No. 10/458,628 dated Aug. 15, 2008.

Office Action issued in USPTO in copending U.S. Appl. No. 10/458,628 dated Feb. 26, 2009.

Office Action issued in USPTO in copending U.S. Appl. No. 10/458,628 dated Oct. 8, 2009.

Office Action issued in USPTO in copending U.S. Appl. No. 10/631,898, dated Feb. 18, 2010.

Hayes et al., Authenticated VLANs: Secure Network Access at Layer 2, Alcatel Telecommunications Review, pp. 280-286 (2002).

Office Action issued by USPTO in copending U.S. Appl. No. 10/925,155, dated Jan. 11, 2010.

Office Action issued in U.S. Appl. No. 10/458,628, dated Mar. 24, 2010.

* cited by examiner

MULTIPLE TIERED NETWORK SECURITY SYSTEM, METHOD AND APPARATUS USING DYNAMIC USER POLICY ASSIGNMENT

BACKGROUND OF THE INVENTION

1. Field of the Invention

The present invention is generally directed to data communications networks. In particular, the present invention is directed to security features for controlling access to a data communications network.

2. Background

There is an increasing demand for additional security features for controlling access to data communications networks. This is due, in large part, to an increase in the use of portable computing devices such as laptop computers and Voice Over Internet Protocol (VoIP) telephones, which can be easily moved from one point of network access to another. While such ease of access may be desirable from an end user perspective, it creates significant concerns from the perspective of network security.

For wired networks, recent security solutions from network vendors have involved pushing authentication functions out to the layer 2 port, such as to a layer 2 switch. One such solution involves authenticating the physical, or Media Access Control (MAC), address of a device coupled to the port of a layer 2 switch. Another solution involves enabling the switch to perform user authentication in accordance with protocols defined by the IEEE 802.1x standard. A further solution builds on the 802.1x protocol to dynamically assign an Access Control List ("ACL") or a MAC address filter to a port of a network switch based on the identity of a user. However, a majority of conventional switches do not provide the ability to implement all of these security features in a single network device.

A product marketed by Cisco Systems, Inc. of San Jose, Calif., designated the Catalyst 3550 Multilayer Switch, apparently provides a combination of the foregoing security features. However, the combination of physical (MAC) address authentication and 802.1x authentication is only provided in a multiple host ("multi-host") configuration, in which one or more computing devices are coupled to a single port of the switch via a central computing device. Furthermore, the 802.1x authentication is always performed prior to physical (MAC) address authentication in the Cisco product. Thus, when a computing device is coupled to a port of the Cisco switch, local resources (e.g., switch resources necessary to perform 802.1x authentication and, optionally, dynamic ACL and/or MAC address filter assignment) as well as network resources (e.g., communication between the switch and an authentication server) will always be expended to authenticate the user, prior to determining whether or not the physical (MAC) address of the device is valid. This results in a waste of such resources in the case where the device has an unauthorized MAC address.

What is needed then is a security solution that improves upon and addresses the shortcomings of known security solutions.

BRIEF SUMMARY OF THE INVENTION

The present invention is directed to a network security system, method and apparatus that substantially obviates one or more of the problems and disadvantages of the related art. In particular, the present invention is directed to a network access device, such as a network switch, that is used to implement a multiple key, multiple tiered system and method for controlling access to a data communications network in both a single host and multi-host environment. The system and method provide a first level of security that comprises authentication of the physical (MAC) address of a user device coupled to a port of the network access device, a second level of security that comprises authentication of a user of the user device if the first level of security is passed, such as authentication in accordance with the IEEE 802.1x standard, and a third level of security that comprises dynamic assignment of a particular user policy to the port based on the identity of the user if the second level of security is passed, wherein access to the port is restricted in accordance with the user policy. The user policy may include an access control list (ACL) and/or a MAC address filter.

Co-pending and co-owned U.S. patent application Ser. No. 10/458,628, entitled "Multiple Tiered Network Security System and Apparatus" to Kwan et al., filed Jun. 11, 2003, describes a network access device that implements a combination of security features including physical (MAC) address authentication, 802.1x user authentication, and dynamic virtual local area network (VLAN) assignment. As discussed in more detail in that application, which is incorporated by reference herein, dynamic VLAN assignment leverages the 802.1x user authentication protocol by dynamically assigning a port of a network access device to a predetermined VLAN based on user identification information provided pursuant to the protocol.

Dynamic VLAN assignment is very useful for small installations where complex VLANs are not in place. Installations that are configured to separate traffic of authenticated users into simple VLAN scenarios will find the dynamic VLAN assignment feature very useful. Examples of simple VLAN implementations may include: (1) VoIP VLAN vs. data VLAN; (2) Trusted User VLAN vs. Untrusted User VLAN; and (3) VLAN implementation where the same VLANs are implemented across all network access devices and each VLAN is uniformly defined to provide the identical levels of network access control.

However, for larger and more complex VLAN implementations that may spread across multiple countries or geographic areas, the definition of a VLAN may vary from each location or from network access device to network access device. In such cases, the dynamic VLAN assignment feature will not be very effective unless the VLANs are reconfigured. This may be very difficult or even impossible to achieve depending on the complexity of the VLAN structure.

An embodiment of the present invention addresses this issue by utilizing dynamic user policies rather than, or in conjunction with, dynamic VLAN assignment to achieve granular, user-based network access control. A user policy may identify or include one or more access control lists (ACLs) and/or MAC address filters that restrict certain types of inbound and/or outbound traffic on a port. In accordance with an embodiment of the present invention, when a user is authenticated in accordance with the 802.1x protocol, an authentication server passes an accept message to a network access device that includes a user policy associated with the user. Based on this user policy, the network access device dynamically assigns the appropriate ACL(s) and/or MAC address filter(s) to the port to regulate network access.

In a further embodiment, the ACL(s) and/or MAC address filter(s) are dynamically assigned to the port provided that the sufficient system resources of the network access device can be allocated for this operation. If the system resources of the network access device are insufficient, then the port is blocked to the user—i.e., the user remains unauthenticated by default.

The present invention provides improved network security as compared to conventional solutions, since it authenticates both the user device and the user. Moreover, the present invention provides network security in a manner more efficient than conventional solutions, since it performs physical (MAC) address authentication of a user device prior to performing the more resource-intensive step of performing user authentication, such as user authentication in accordance with a protocol defined by the IEEE 802.1x standard. Furthermore, the present invention provides granular, user-based network access control through the use of dynamic user policy assignment.

In accordance with one embodiment of the present invention, a network access device for providing network security is provided. The network access device includes a plurality of input ports and a switching fabric for routing data received on the plurality of input ports to at least one output port. The network access device also includes control logic adapted to authenticate a physical address of a user device coupled to one of the plurality of input ports and to authenticate user information provided by a user of the user device only if the physical address is valid. Additionally, the control logic is adapted to restrict access to the particular input port in accordance with a user policy associated with the user information only if the user information is valid.

In an alternate embodiment of the present invention, a method for providing network security is provided. The method includes authenticating a physical address of a user device coupled to a port of a network access device, and authenticating user information provided by a user of the user device only if the physical address is valid. The method further includes restricting access to the port in accordance with a user policy associated with the user information only if the user information is valid.

In another embodiment of the present invention, a network system is provided. The system includes a data communications network, a network access device coupled to the data communications network, and a user device coupled to a port of the network access device. The network access device is adapted to authenticate a physical address of the user device and to authenticate user information provided by a user of the user device only if the physical address is valid. Additionally, the network access device is adapted to restrict access to the port in accordance with a user policy associated with the user information only if the user information is valid.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
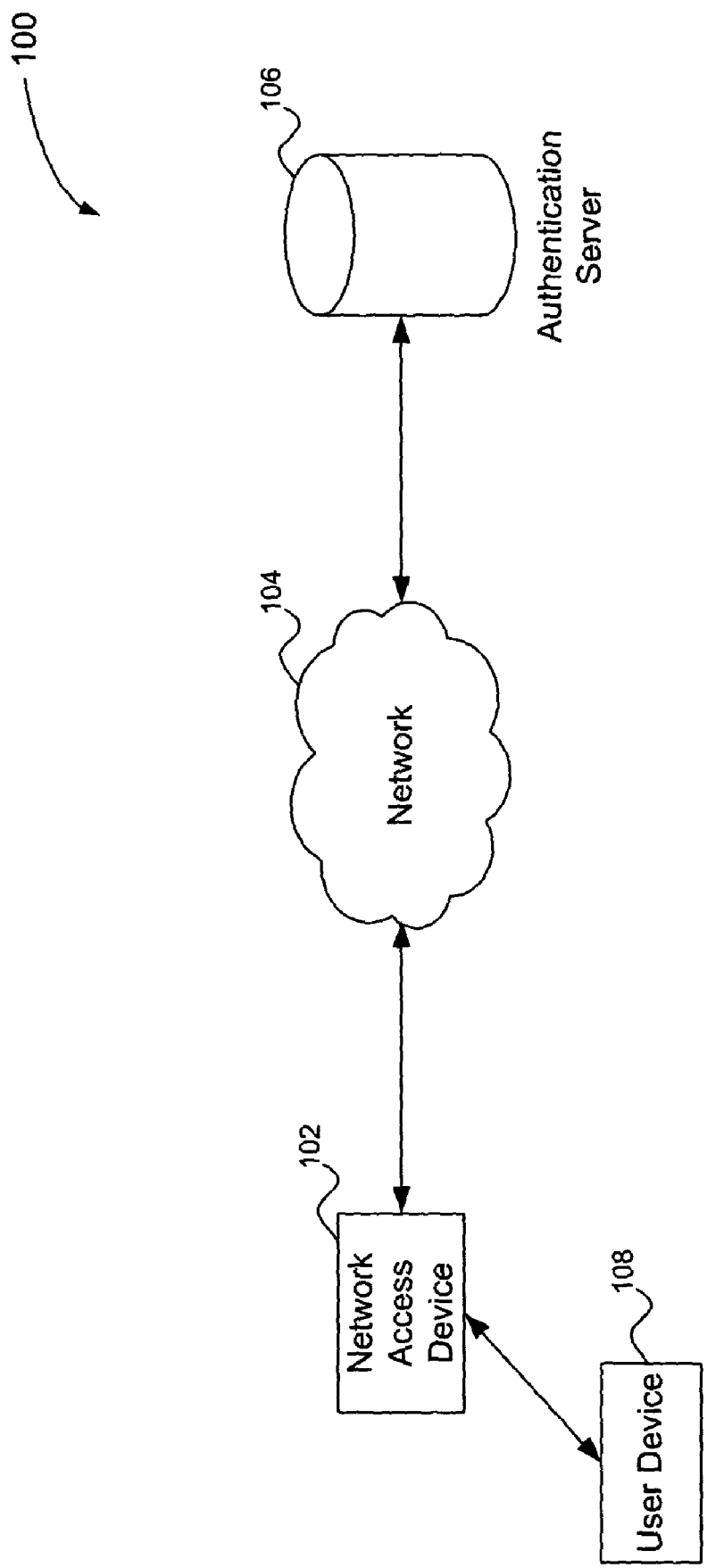
FIG. 1 depicts the basic elements of a multiple tiered network security system implementing dynamic user policy assignment in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview

The present invention is directed to a multiple key, multiple tiered network security system, method and apparatus. The system, method and apparatus provides at least three levels of security. The first level comprises physical MAC address authentication of a user device being attached to a network, such as a user device being coupled to a port of a network access device. The second level comprises authentication of the user of the user device, such as authentication in accordance with the IEEE 802.1x standard. The third level comprises dynamic assignment of a particular user policy to the port based on the identity of the user, wherein the user policy is used to selectively control access to the port. The user policy may identify or include an access control list (ACL) or MAC address filter. Failure to pass a lower security level results in a denial of access to subsequent levels of authentication.

B. Multiple Tiered Security System, Method and Apparatus in Accordance with an Embodiment of the Present Invention FIG. 1 depicts the basic elements of a multiple tiered network security system 100 in accordance with an embodiment of the present invention. As shown in FIG. 1, system 100 comprises a data communications network 104, a network access device 102 and an authentication server 106 each of which is communicatively coupled to data communications network 104, and a user device 108 communicatively coupled to network access device 102.

Data communications network 104 comprises a plurality of network nodes interconnected via a wired and/or wireless medium, wherein each node consists of a device capable of transmitting or receiving data over data communications network 104. In the embodiment described herein, data communications network 104 comprises a conventional local area network ("LAN") that employs an Ethernet communication protocol in accordance with the IEEE 802.3 standard for data link and physical layer functions. However, the invention is not so limited, and data communications network 104 may comprise other types of wired or wireless networks, including but not limited to a wide area network ("WAN"), and other types of communication protocols, including but not limited to ATM, token ring, ARCNET, or FDDI (Fiber Distributed Data Interface) protocols.

Network access device 102, which preferably comprises a network switch, comprises a plurality of ports for communicatively interconnecting network devices to each other and to data communications network 104. Network access device 102 is configured to channel data units, such as data packets or frames, between any two devices that are attached to it up to its maximum number of ports. In terms of the International Standards Organization's Open Systems Interconnection (OSI) model, network access device 102 performs layer 2, or data link layer, functions. In particular, network access device 102 examines each received data unit and, based on a destination address included therein, determines which network device the data unit is intended for and switches it out toward that device. In the embodiment described herein, the destination address comprises a physical or Media Access Control (MAC) address of a destination device.

Figure 2:
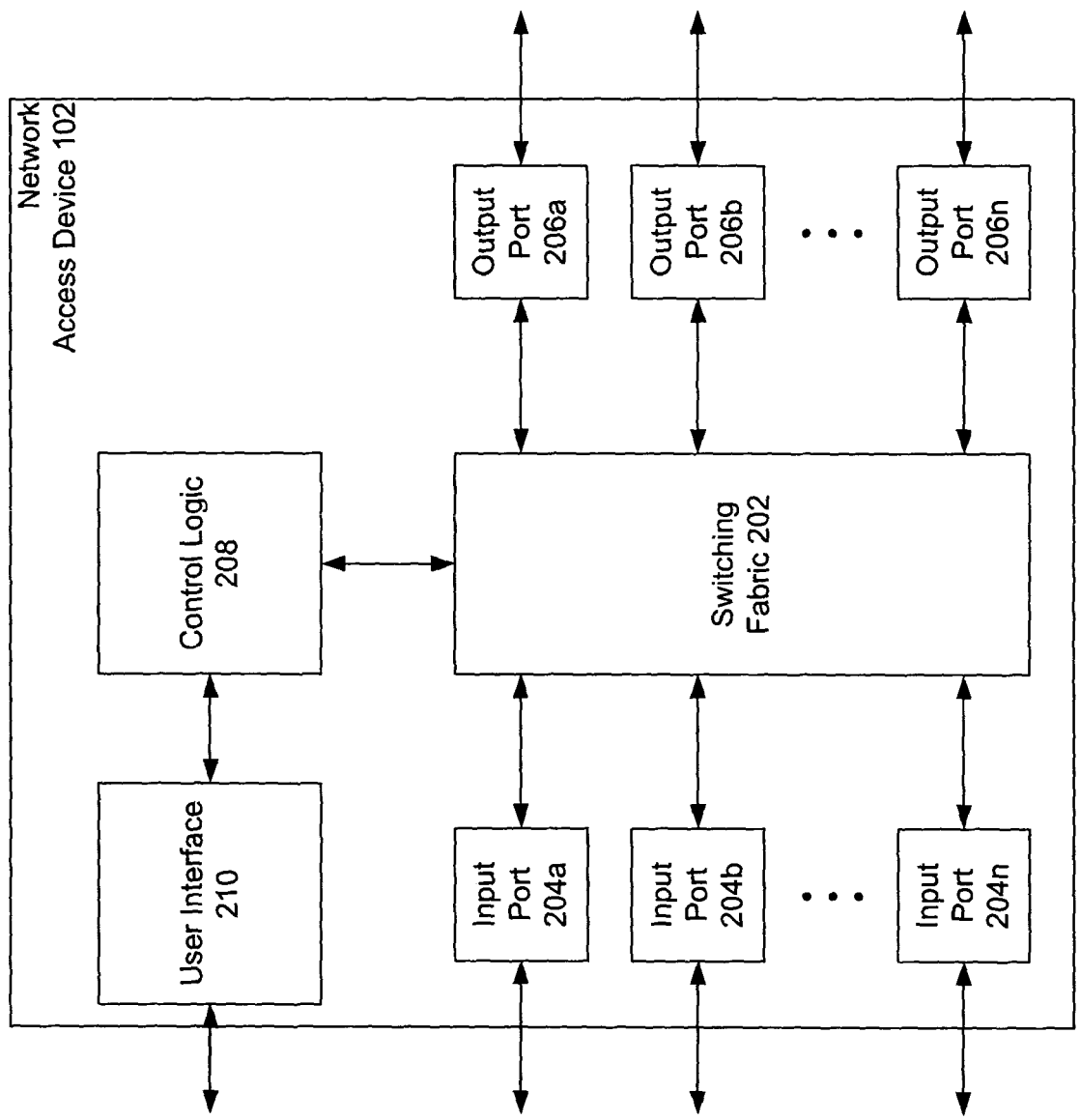
FIG. 2 depicts an exemplary high-level architecture of a network access device in accordance with an embodiment of the present invention.

FIG. 2 depicts an exemplary high-level architecture of network access device 102 in accordance with an embodiment of the present invention. As shown in FIG. 2, network access device 102 comprises a plurality of input ports, 204a through 204n, that are coupled to a plurality of output ports, 206a through 206n, via a switching fabric 202. Network access device 102 also includes control logic 208 for controlling various aspects of switch operation and a user interface 210 to facilitate communication with control logic 208. User interface 210 provides a means for a user, such as a system administrator, to reconfigure network access device 102 and adjust operating parameters.

In operation, data units (e.g., packets or frames) are received and optionally buffered on one or more of input ports 204a through 204n. Control logic 208 schedules the serving of data units received by input ports 204a through 204n in accordance with a predetermined scheduling algorithm. Data units are then served to switching fabric 202, which routes them to the appropriate output port 206a through 206n based on, for example, the destination address of the data unit. Output ports 206a through 206n receive and optionally buffer data units from switching fabric 202, and then transmit them on to a destination device. In accordance with an embodiment of the present invention, network access device 102 may also include logic for performing routing functions (layer 3 or network layer functions in OSI).

With further reference to FIG. 1, a user device 108 is shown connected to one of the ports of network access device 102. User device 108 may comprise a personal computer (PC), laptop computer, Voice Over Internet Protocol (VoIP) phone, a wireless access point, or any other device capable of transmitting or receiving data over a data communications network, such as data communications network 104. As described in more detail herein, the security features of the present invention are particularly useful in the instance where user device 108 is highly portable, and thus may be readily moved from one point of network access to another.

Authentication server 106 comprises a computer that stores application software and a database of profile information for performing a user authentication protocol that will be described in more detail herein. In an embodiment, authentication server 106 comprises a server that uses the Remote Authentication Dial-In User Service (RADIUS) as set forth in Internet Engineering Task Force (IETF) Request For Comments (RFC) 2865 for performing user authentication functions.

Figure 3:
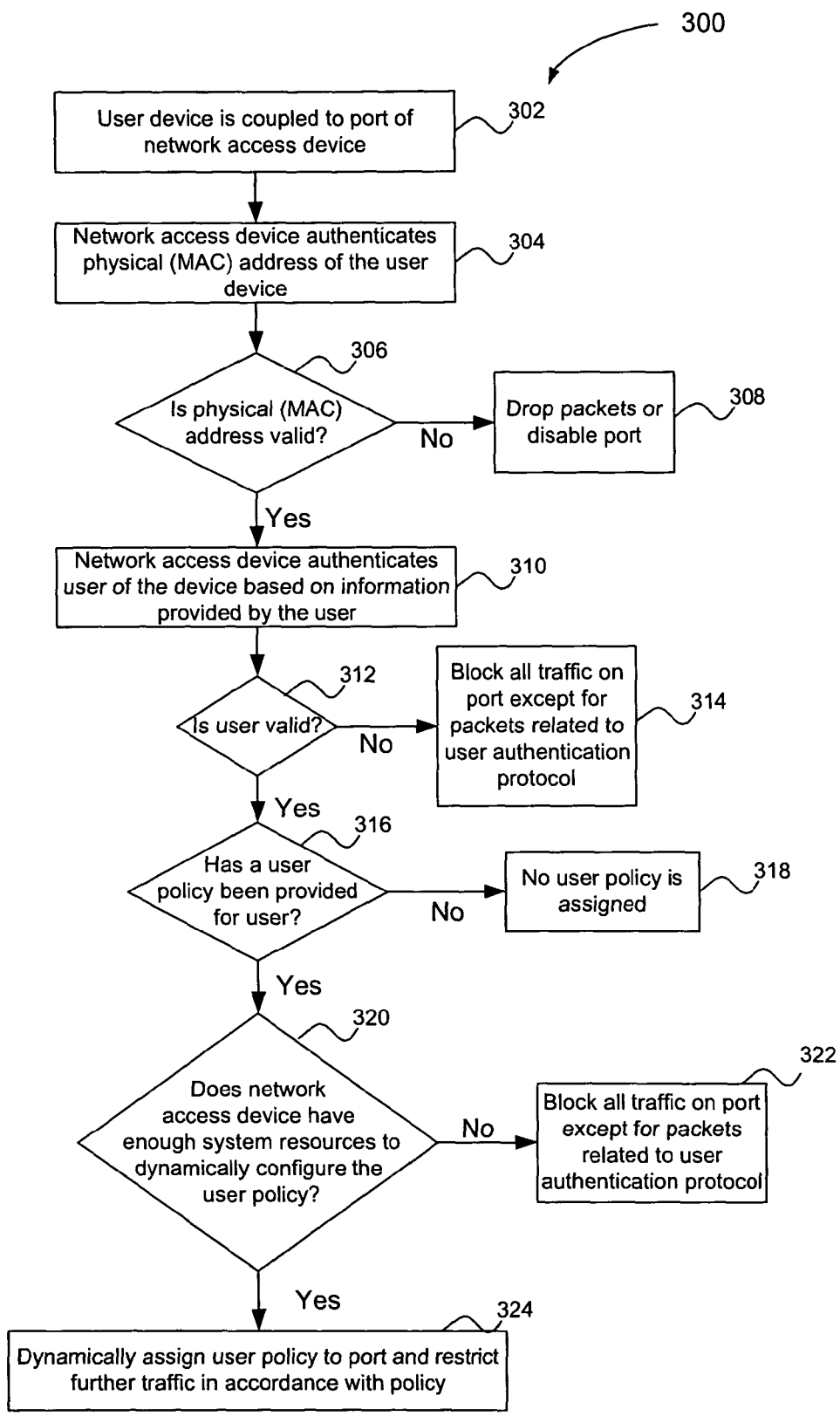
FIG. 3 illustrates a flowchart of a multiple tiered network security method that implements dynamic user policy assignment in accordance with an embodiment of the present invention.

FIG. 3 illustrates a flowchart 300 of a multiple tiered network security method in accordance with an embodiment of the present invention. The invention, however, is not limited to the description provided by the flowchart 300. Rather, it will be apparent to persons skilled in the relevant art(s) from the teachings provided herein that other functional flows are within the scope and spirit of the present invention. Flowchart 300 will be described with continued reference to example system 100 described above in reference to FIG. 1. The invention, however, is not limited to that embodiment.

The method of flowchart 300 begins at step 302, in which user device 108 is coupled to a port of network access device 102. Coupling user device 108 to a port of network access device 102 may comprise, for example, coupling user device 108 to an RJ-45 connector, which is in turn wired to a port of network access device 102.

At step 304, network access device 102 performs a physical (MAC) address authentication of user device 108. As will be described in more detail herein, network access device 102 performs this step by comparing a MAC address of user device 108 with a limited number of "secure" MAC addresses that are stored by network access device 102. As shown at step 306, if packets received from user device 108 have a source MAC address that does not match any of the secure addresses, then the protocol proceeds to step 308, in which network access device 102 either drops the packets or, alternately, disables the port entirely, thereby terminating the security protocol. In a further embodiment of the present invention, network access device 102 can also re-direct the packets to a network destination other than their originally intended destination based on the detection of an invalid source MAC address.

As further shown at step 306, if packets received from user device 108 have a source MAC address that does match one of the secure addresses, then the MAC address is valid and the security protocol proceeds to step 310.

At step 310, network access device 102 authenticates a user of user device 108 based upon credentials provided by the user. In an embodiment discussed in more detail herein, this step entails performing user authentication in accordance with the IEEE 802.1x standard, and involves sending the user credentials in a request message to authentication server 106 and receiving an accept or reject message in return, the accept or reject message indicating whether the user is valid. As shown at step 312, if the user is not valid, then the security protocol proceeds to step 314, in which network access device 102 blocks all traffic on the port except for the reception or transmission of packets related to the user authentication protocol (e.g., 802.1x control packets). However, as also shown at step 312, if the user is valid, then the security protocol proceeds to step 316.

At step 316, network access device 102 determines whether a user policy has been provided for the user. As will be discussed in more detail herein, this step entails determining whether a user policy has been provided as part of the accept message returned from authentication server 106. A user policy may identify or include one or more access control lists (ACLs) or MAC address filters for controlling network access by the user. If a user policy has not been provided for the user, then no user policy is assigned to the port to which user device 108 is coupled as shown at step 318.

If, however, a user policy has been provided, then network access device 102 determines whether sufficient system resources are available to dynamically assign the user policy to the port, as shown at step 320. If sufficient resources are not available, then network access device 102 blocks all traffic on the port except for the reception or transmission of packets related to the user authentication protocol (e.g., 802.1x control packets) as shown at step 322. If sufficient resources are available, then network access device 102 dynamically assigns the user policy to the port and restricts traffic on the port in accordance with the policy, as shown at step 324.

With reference to the exemplary embodiment of FIG. 2, the security functions performed by network access device 102, as described above, are performed by control logic 208. As will be appreciated by persons skilled in the relevant art(s), such functions may be implemented in hardware, software or a combination thereof.

C. Physical Address Authentication of User Device in Accordance with an Embodiment of the Present Invention As discussed above, network access device 102 is adapted to perform a physical (MAC) address authentication of a user device that is coupled to one of its ports. In particular, network access device 102 is adapted to store a limited number of "secure" MAC addresses for each port. A port will forward only packets with source MAC addresses that match its secure addresses. In an embodiment, the secure MAC addresses are specified manually by a system administrator. In an alternate embodiment, network access device 102 learns the secure MAC addresses automatically. If a port receives a packet having a source MAC address that is different from any of the secure learned addresses, a security violation occurs.

With reference to the embodiment of network access device 102 depicted in FIG. 2, secure addresses for each input port 204a through 204n are stored in a local memory assigned to each port. Alternately, secure addresses are stored in a shared global memory, or in a combination of local and global memory.

In an embodiment, when a security violation occurs, network access device 102 generates an entry to a system log and an SNMP (Simple Network Management Protocol) trap. In addition, network access device 102 takes one of two actions as configured by a system administrator: it either drops packets from the violating address or disables the port altogether for a specified amount of time.

In a further embodiment of the present invention, a system administrator can configure network access device 102 to re-direct packets received from the violating address to a different network destination than that originally intended. Network access device 102 may achieve this by altering the packet headers. For example, network access device 102 may alter a destination address of the packet headers. Alternately, the re-direction may be achieved by generating new packets with identical data payloads but having different packet headers. As will be appreciated by persons skilled in the relevant art(s), the decision to configure network access device 102 to re-direct traffic from a violating address may be premised on the resulting burden to network access device 102 in handling traffic from that address.

Figure 4:
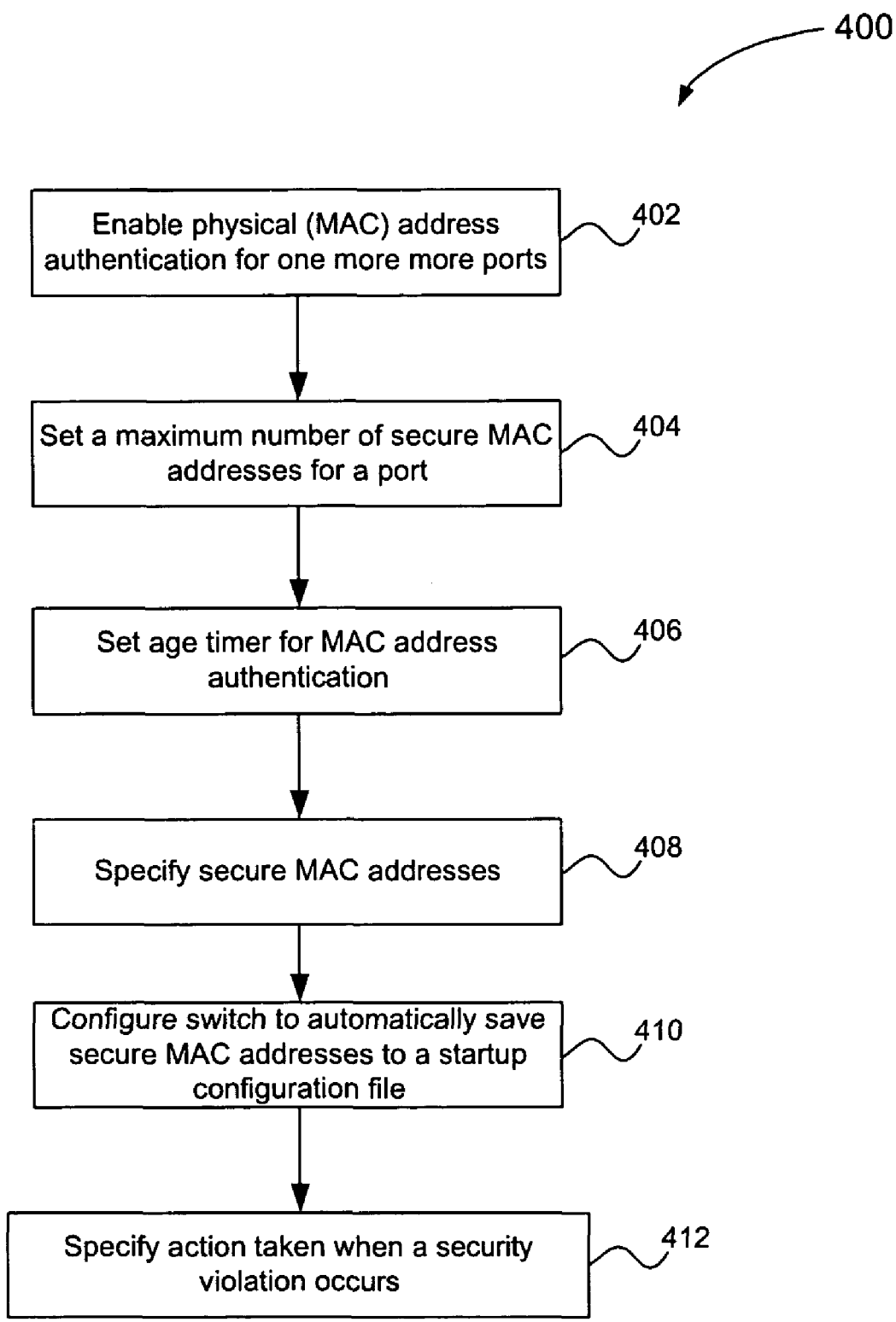
FIG. 4 illustrates a flowchart of a method for enabling physical address authentication of a network access device coupled to a data communications network in accordance with an embodiment of the present invention.

FIG. 4 illustrates a flowchart 400 of a method for enabling physical address authentication of a device coupled to a data communications network in accordance with an embodiment of the present invention. In particular, flowchart 400 represents steps performed by a system administrator in order to configure a network access device to perform physical address authentication in accordance with an embodiment of the invention. The invention, however, is not limited to the description provided by the flowchart 400. Rather, it will be apparent to persons skilled in the relevant art(s) from the teachings provided herein that other functional flows are within the scope and spirit of the present invention.

At step 402, the system administrator enables the MAC address authentication feature for one or more ports of the network access device. In an embodiment, the security feature is disabled on all ports by default, and a system administrator can enable or disable the feature globally on all ports at once or on individual ports.

At step 404, the system administrator sets a maximum number of secure MAC addresses for a port. In an embodiment, the network access device utilizes a concept of local and global "resources" to determine how many MAC addresses can be secured on each port. In this context, "resource" refers to the ability to store one secure MAC address entry. For example, each interface may be allocated 64 local resources and additional global resources may be shared among all the interfaces on the network access device.

In an embodiment, when the MAC address authentication feature is enabled for a port, the port can store one secure MAC address by default. A system administrator can then increase the number of MAC addresses that can be secured to a maximum of 64, plus the total number of global resources available. The number of addresses can be set to a number from 0 to (64+the total number of global resources available). For example, the total number of global resources may be 2048 or 4096, depending on the size of the memory allocated. When a port has secured enough MAC addresses to reach its limit for local resources, it can secure additional MAC addresses by using global resources. Global resources are shared among all the ports on a first come, first-served basis.

At step 406, the system administrator sets an age timer for the MAC address authentication feature. In an embodiment, secure MAC addresses are not flushed when a port is disabled and brought up again. Rather, based on how the network access device is configured by the system administrator, the secure addresses can be kept secure permanently, or can be configured to age out, at which time they are no longer secure. For example, in an embodiment, the stored MAC addresses stay secure indefinitely by default, and the system administrator can optionally configure the device to age out secure MAC addresses after a specified amount of time.

At step 408, the system administrator specifies secure MAC addresses for a port. Alternately, the network access device can be configured to automatically "learn" secure MAC addresses by storing the MAC addresses of devices coupled to the port up to the maximum number of secure addresses for the port. These stored MAC addresses are then used as the secure addresses for authentication purposes.

At step 410, the system administrator optionally configures the network access device to automatically save the list of secure MAC addresses to a startup-configuration ("startup-config") file at specified intervals, thus allowing addresses to be kept secure across system restarts. For example, learned secure MAC addresses can be automatically saved every twenty minutes. The startup-config file is stored in a memory within the network access device. In an embodiment, by default, secure MAC addresses are not automatically saved to a startup-config file.

At step 412, the system administrator specifies the action taken when a security violation occurs. In the case where the system administrator has specified the secure MAC addresses for the port, a security violation occurs when the port receives a packet with a source MAC address that is different than any of the secure MAC addresses. In the case where the port is configured to "learn" secure MAC addresses, a security violation occurs when the maximum number of secure MAC addresses has already been reached, and the port receives a packet with a source MAC address that is different than any of the secure MAC addresses. In an embodiment, the system administrator configures the network access device to take one of two actions when a security violation occurs: either drop packets from the violating address or disable the port altogether for a specified amount of time.

D. User Authentication and Dynamic User Policy Assignment in Accordance with an Embodiment of the Present Invention As discussed above, network access device 102 is further adapted to perform user authentication if user device 108 has a valid physical (MAC) address. In an embodiment, user authentication is performed in accordance with the IEEE 802.1x standard. As will be appreciated by persons skilled in the relevant art(s), the 802.1x standard utilizes the Extensible Authentication Protocol (EAP) for message exchange during the authentication process.

In accordance with 802.1x, a user (known as the supplicant) requests access to a network access point (known as the authenticator). The access point forces the user's client software into an unauthorized state that allows the client to send only an EAP start message. The access point returns an EAP message requesting the user's identity. The client returns the identity, which is then forwarded by the access point to an authentication server, which uses an algorithm to authenticate the user and then returns an accept or reject message back to the access point. Assuming an accept message was received, the access point changes the client's state to authorized and normal communication can take place.

In accordance with the embodiment of the invention described in reference to FIG. 1, and with reference to the 802.1x protocol described above, the user of user device 108 is the supplicant, network access device 102 is the authenticator, and authentication server 106 is the authentication server. In an embodiment, authentication server 106 comprises a server that uses the Remote Authentication Dial-In User Service (RADIUS) as described in RFC 2865, and may therefore be referred to as a RADIUS server.

In further accordance with an embodiment of the present invention, authentication server 106 provides a user policy to network access device 102 as part of the message granting authorization to a particular user. The user policy is included in an access profile for the user, which is configured by a network administrator and maintained in a database by authentication server 106. By storing the user policies on the authentication server, the policies only need to be created once the authentication server. When a user policy is passed back to network access device 102, network access device 102 determines if the user policy is valid, and, if so, dynamically assigns the user policy to the port to which user device 108 is coupled. In accordance with an embodiment of the present invention, a user policy may identify or include one or more access control lists (ACLs) or MAC address filters for controlling network access by the user.

An ACL is used to selectively permit or deny packets on a port in the inbound and/or outbound direction. An ACL filters traffic based on certain predefined criteria, and then either permits or denies traffic. As used herein, a "standard IP ACL" refers to an ACL that is used to permit or deny packets based on a source IP address of the packet. As also used herein, an "extended IP ACL" refers to an ACL that is used to permit or deny packets based on a source IP address, destination IP addresses, type of service, precedence, and/or protocol contained in the packet. TCP and UDP packets can be further filtered in accordance with an extended IP ACL by source and destination service ports. In accordance with an embodiment of the present invention, one IP ACL can be configured per port in the inbound direction and one IP ACL can be configured per port in the outbound direction. However, the invention is not so limited and, in an alternate embodiment, multiple ACLs may be configured per port in the inbound and/or outbound direction.

A MAC address filter is used to selectively permit or deny packets on a port based on whether a packet is associated with certain predefined MAC addresses. A MAC address filter is typically used to control the inbound flow of traffic only. In accordance with an embodiment of the present invention, one MAC address filter can be configured per port in the inbound direction and no MAC address filter is configured in the outbound direction. However, the invention is not so limited and, in an alternate embodiment, multiple MAC address filters can be configured per port in the inbound direction and one or more MAC address filters can be configured per port in the outbound direction.

Figure 5:
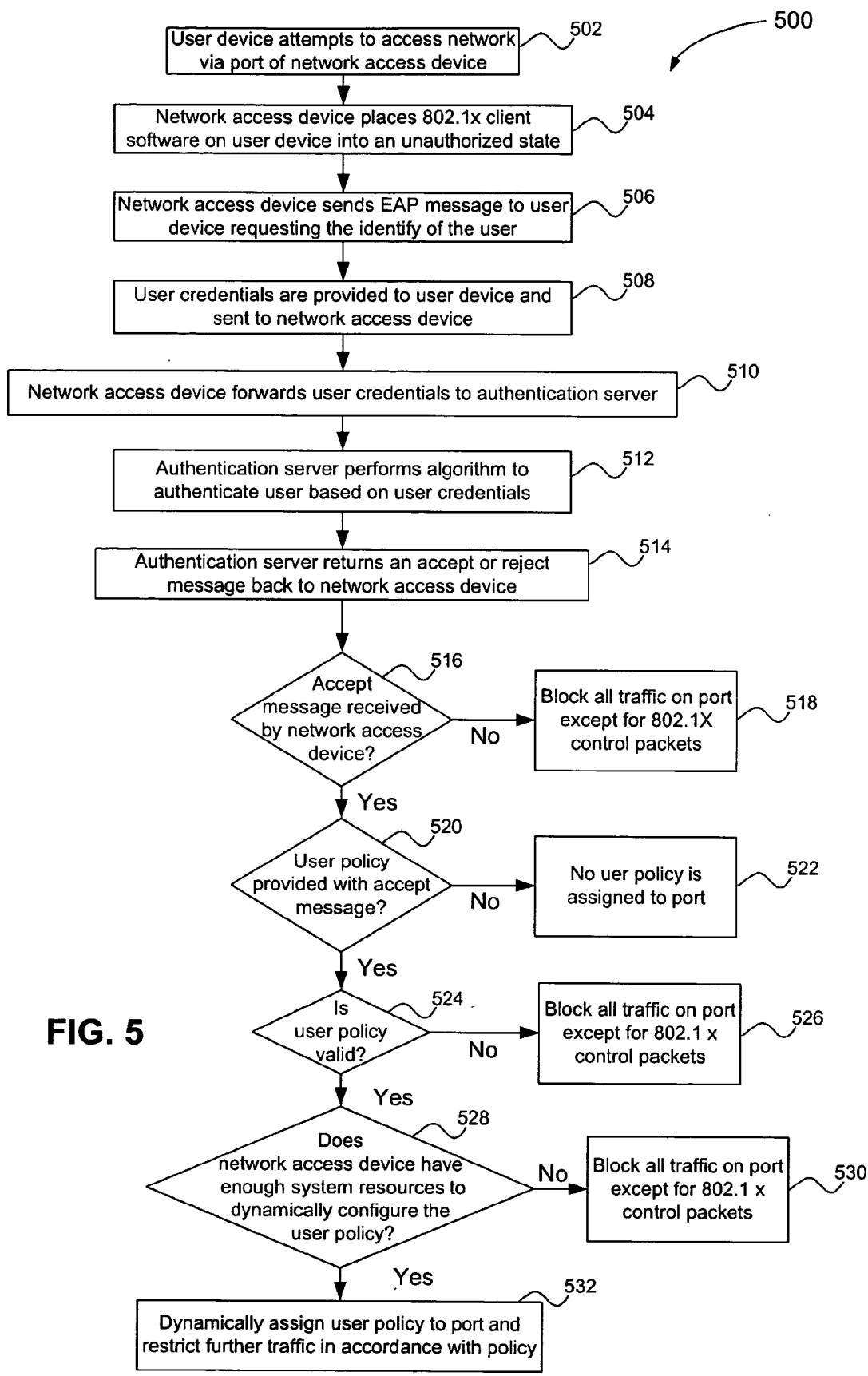
FIG. 5 illustrates a flowchart of a method for performing user authentication and dynamic user policy assignment in accordance with an embodiment of the present invention.

FIG. 5 illustrates a flowchart 500 of a method for performing user authentication and dynamic user policy assignment in accordance with an embodiment of the present invention. The invention, however, is not limited to the description provided by the flowchart 500. Rather, it will be apparent to persons skilled in the relevant art(s) from the teachings provided herein that other functional flows are within the scope and spirit of the present invention. Flowchart 500 will be described with continued reference to example system 100 described above in reference to FIG. 1. The invention, however, is not limited to that embodiment.

The method of flowchart 500 begins at step 502, in which user device 108 attempts to access data communications network 104 via network access device 102. In response, network access device 102 places 802.1x client software on user device 108 into an unauthorized state that permits the client software to send only an EAP start message, as shown at step 504. Network access device 102 also returns an EAP message to user device 108 requesting the identity of the user, as shown at step 506.

At step 508, the user of user device 108 inputs identity information or credentials, such as a user name and password, into user device 108 that are returned to network access device 102. Network access device 102 then generates an authentication call which forwards the user credentials to authentication server 106, as shown at step 510, and authentication server 106 performs an algorithm to authenticate the user based on the user credentials, as shown at step 512.

At step 514, authentication server 106 returns either an accept or reject message back to network access device 102. As shown at step 516, if authentication server 106 sends a reject message back to network access device 102, the protocol proceeds to step 518. At step 518, network access device 102 blocks all traffic on the port except for the reception or transmission of 802.1x control packets (e.g., EAPOL packets) on the port. However, if authentication server 106 sends an accept message back to network access device 102, then the protocol proceeds to step 520.

At step 520, network access device 102 parses the accept message to determine if user policy has been provided for the user. In an embodiment of the present invention, authentication server 106 provides a user policy by populating a Filter-ID and/or a Vendor-Specific Attributes fields of a RADIUS Access-Accept message. The format of an Access-Accept message and the individual fields included therein is described in IETF RFC 2865 and RFC 2138, the contents of which are incorporated by reference as if set forth fully herein.

In an embodiment, the Filter-ID field is used to identify one or more Access Control Lists (ACLs) or MAC address filters that are already configured on network access device 102. A name or number may be used to identify a configured ACL. For example, text formatted as follows may be included in the Filter-ID to specify a configured standard or extended IP ACL in either the inbound or outbound direction:

| Numbered IP ACL inbound direction: | ip.number.in |
| Named IP ACL inbound direction: | ip.name.in |

Furthermore, text formatted as follows may be included in the Filter-ID to specify a configured MAC address filter in the inbound direction:

Numbered MAC Address Filter inbound direction: mac.number.in

In an embodiment, the Vendor-Specific Attributes field is used to provide one or more actual ACLs or MAC address filters for dynamic configuration by network access device 102. For example, text formatted as follows may be included in the Vendor-Specific Attributes field to pass a standard or extended IP ACL to network access device 102:

| Named Standard IP ACL inbound direction: | ipacl.s.in=<entry> |
| Named Standard IP ACL outbound direction: | ipacl.s.out=<entry> |
| Named Extended IP ACL inbound direction: | ipacl.e.in=<entry> |
| Named Extended IP ACL outbound direction: | ipacl.e.out=<entry> |

Furthermore, text formatted as follows may be included in the Vendor Specific Attributes field to pass a MAC address filter

| MAC address filter inbound direction: | macfilter.in=<entry> |

As shown at step 522, if a user policy has not been provided as part of the accept message, then network access device 102 does not assigns a user policy to the port. However, if a user policy has been provided as part of the accept message, then network access device 102 determines if the user policy is valid, as shown at step 524. For example, if the user policy identifies a configured IP ACL and/or MAC address filter, then network access device 102 will confirm that it supports such an IP ACL and/or MAC address filter. Alternately, if the user policy actually includes an IP ACL and/or MAC address filter, network access device 102 will determine whether the IP ACL and/or MAC address filter has been provided in a valid format for dynamic assignment to the port.

If the user policy provided as part of the accept message is not valid, then network access device 102 blocks all traffic on the port except for the reception or transmission of 802.1x control packets (e.g., EAPOL packets) on the port, as shown at step 526. However, if the user policy is valid, then network access device 102 determines whether sufficient system resources are available to dynamically assign the user policy to the port, as shown at step 528. If sufficient resources are not available, then network access device 102 blocks all traffic on the port except for the reception or transmission of 802.1x control packets (e.g., EAPOL packets) on the port as shown at step 530. However, if there are sufficient resources available, then network access device 102 dynamically assigns the user policy to the port and then restricts further traffic on the port in accordance with the policy, as shown at step 532.

In accordance with an embodiment of the present invention, ACLs that are already configured on network access device 102 and ACLs that are received for dynamic port assignment are identified by numbers from different number ranges, thereby allowing network access device 102 to distinguish between the two types of ACLs. Network access device 102 can use this information to ensure, for example, that an ACL received for dynamic assignment is not automatically saved when a "write memory" function is executed to save configuration information to a start-up configuration file. By using a different numbering range, network access device 102 can easily determine if there are any dynamic ACLs configured on the device and execute the "write memory" feature appropriately. Alternatively, network access device 102 can warn an administrator that a dynamic user policy has been configured and allow them to either save it or not save it when they perform a "write memory."

In accordance with a further embodiment of the present invention, the above-described method for dynamic user policy assignment is implemented in combination with a method for dynamic VLAN assignment as described in co-pending and co-owned U.S. patent application Ser. No. 10/458,628, entitled "Multiple Tiered Network Security System and Apparatus" to Kwan et al., filed Jun. 11, 2003, the entirety of which is incorporated by reference as if set forth fully herein. In accordance with such a combination, the accept message received from authentication server 106 may also include a VLAN identifier that permits network access device 102 to dynamically assign the port to a VLAN associated with the user. The combination of dynamic user policy assignment and dynamic VLAN assignment can provide an even greater level of network access control if so desired.

Figure 6:
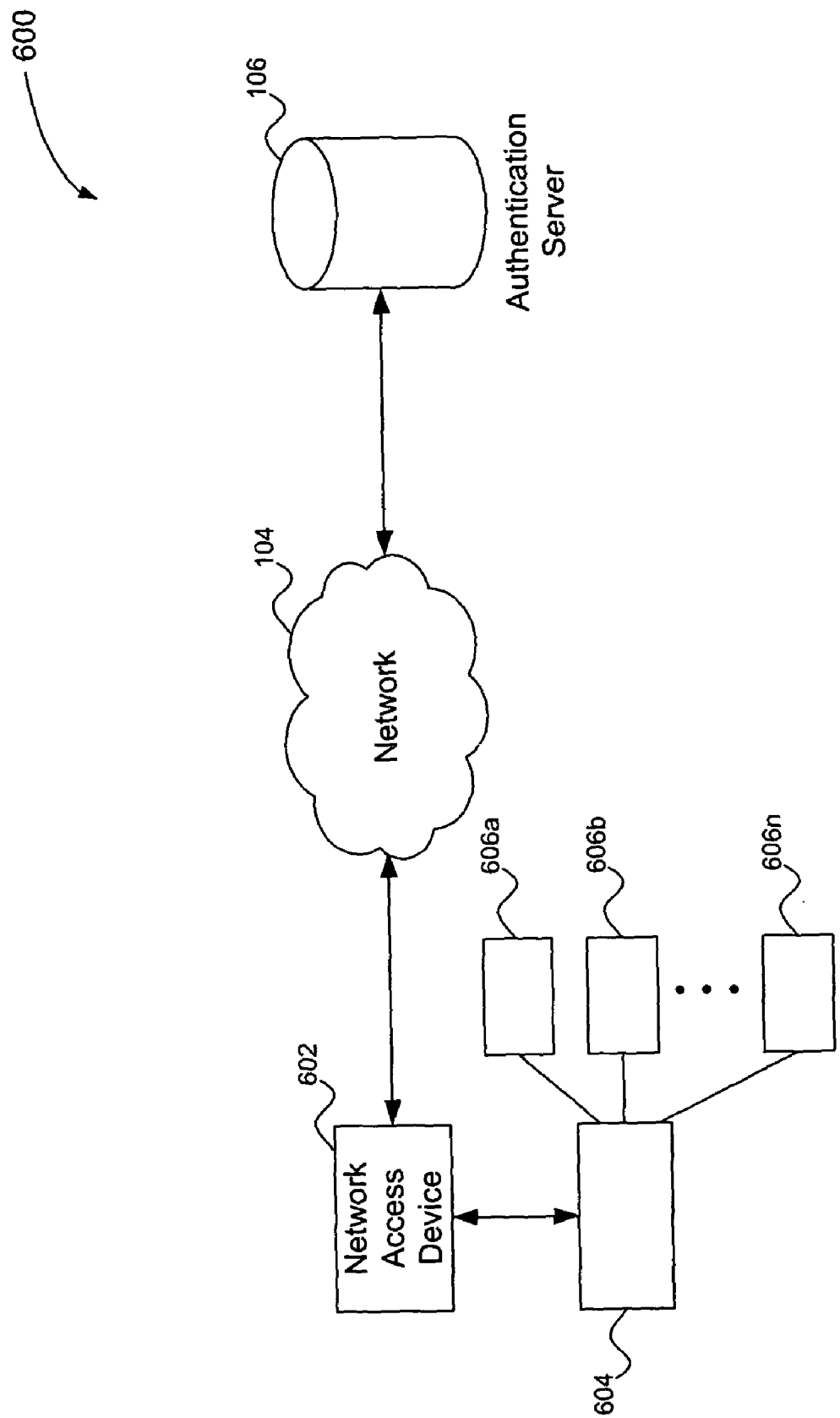
FIG. 6 depicts a multiple tiered network security system that accommodates a plurality of user devices in a multi-host configuration in accordance with an embodiment of the present invention.

E. Multiple Tiered Security System, Method and Apparatus for Multi-Host Environments in Accordance with an Embodiment of the Present Invention The multiple tiered security protocol described above may be advantageously implemented in both single host and multiple host (multi-host) environments. FIG. 1 depicts a single host environment, as only a single user device 108 is coupled to a port of network access device 102. FIG. 6 depicts an alternate embodiment of the present invention that accommodates a plurality of user devices in a multi-host configuration. In particular, FIG. 6 a multiple tiered network security system 600 that comprises a data communications network 104, a network access device 602 and an authentication server 106 each of which is communicatively coupled to data communications network 104. A central user device 604 is coupled to network access device 602 and a plurality of additional user devices 606a through 606n are coupled to network access device 602 via central user device 604 in a multi-host configuration.

The multiple tiered security protocol described above may be advantageously implemented in system 600 in a variety of ways. For example, network access device 602 may perform physical (MAC) address authentication of central user device 604 only, and then authenticate the users of all the user devices if it determines that central user device 604 has a valid MAC address. If central user device 604 has an invalid MAC address, then the port may be closed to all user devices. Alternately, network access device 602 may perform physical (MAC) address validation of each of the user devices prior to authenticating their users. In this case, network access device 602 can selectively accept packets from user devices having valid MAC addresses while dropping packets from user devices having invalid MAC addresses.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A network access device comprising:
    a plurality of input ports;
    a memory for storing data packets received on the plurality of input ports;
    a switching fabric configured for packet switching of the data packets to at least one output port; and
    control logic adapted to:
        examine a first data packet comprising a physical address of a user device coupled to one of the plurality of input ports;
        authenticate the physical address;
        if the authentication of the physical address indicates the physical address is valid, authenticate one or more user credentials provided in a second data packet by a user of the user device after the physical address is authenticated;
        if the authentication of the one or more user credentials indicates the one or more user credentials are valid, determine if the network access device has sufficient system resources to dynamically configure a user policy;
        if the determination indicates the network access device has sufficient system resources, dynamically assign the user policy to the one of the plurality of input ports; and restrict further traffic on the one of the plurality of input ports in accordance with the user policy; and
        if the authentication of the physical address indicates the physical address is invalid, or if the determination indicates insufficient system resources, block traffic on the one of the plurality of ports except for packets related to a user authentication protocol.

2. The network access device of claim 1, wherein the physical address comprises a Media Access Control (MAC) address.

3. The network access device of claim 1, wherein the control logic is adapted to authenticate the user information in accordance with an IEEE 802.1x protocol.

4. The network access device of claim 1, wherein the user policy identifies an access control list.

5. The network access device of claim 1, wherein the user policy includes an access control list.

6. The network access device of claim 1, wherein the user policy identifies a Media Access Control (MAC) address filter.

7. The network access device of claim 1, wherein the user policy includes a Media Access Control (MAC) address filter.

8. The network access device of claim 1, wherein the control logic is adapted to send the one or more user credentials to an authentication server and to receive an accept message from the authentication server if the user information is valid.

9. The network access device of claim 8, wherein the authentication server comprises a Remote Authentication Dial-In User Service (RADIUS) server.

10. The network access device of claim 8, wherein the accept message includes the user policy.

11. The network access device of claim 1, wherein the control logic is further adapted to assign the one of the plurality of input ports to a virtual local area network (VLAN) associated with the one or more user credentials if the one or more user credentials are valid.

12. The network access device of claim 11, wherein the control logic is adapted to receive a message from an authentication server, wherein the message comprises a VLAN identifier (ID) associated with the one or more user credentials, and to assign the one of the plurality of input ports to a VLAN associated with the VLAN ID.

13. The network access device of claim 2 wherein the control logic is further configured to:
    if authentication of the MAC address indicates the MAC address is invalid,
        drop packets from the user device; or
        disable the port;
    if authentication of user information indicates the user information is valid, determine whether the user is associated with a VLAN supported by the network access device;
    if the user is not associated with the VLAN,
        assign the port to a port default VLAN; and
        block all traffic on the port except for packets related to the user authentication protocol; and
    if the user is associated with the VLAN,
        assign the port to the VLAN associated with the user; and
        forward packets from the user device.

14. The device of claim 1 wherein the user information comprises a user name and a password.

15. The network access device of claim 1 wherein the control logic is further adapted to:
    if the authentication of the user information indicates the user information is invalid, block all traffic on the one of the plurality of input ports except for packets related to a user authentication protocol.

16. A computer implemented method for providing network security, the method comprising:
    at a network access device comprising a plurality of input ports and configured for packet switching of data packets, examining a first data packet comprising a physical address of a user device coupled to one of the plurality of input ports;
    authenticating the physical address;
    if the authentication of the physical address indicates the physical address is valid, authenticating one or more user credentials provided in a second data packet by a user of the user device after the physical address is authenticated;
    if the authentication of the one or more user credentials indicates the one or more user credentials are valid, determining if the network access device has sufficient system resources to dynamically configure a user policy;
    if the determining indicates sufficient system resources, dynamically assigning the user policy to the one of the plurality of input ports and restricting further traffic on the port in accordance with the user policy; and if the authentication of the physical address indicates the physical address is invalid, or if the determining indicates insufficient system resources, blocking traffic on the one of the plurality of ports except for packets related to a user authentication protocol.

17. The method of claim 16, wherein the authenticating a physical address comprises authenticating a Media Access Control (MAC) address.

18. The method of claim 16, wherein the authenticating the user information comprises authenticating the user information in accordance with an IEEE 802.1x protocol.

19. The method of claim 16, wherein the restricting access comprises restricting access to the one of the plurality of input ports in accordance with an access control list.

20. The method of claim 16, wherein the restricting access comprises restricting access to the one of the plurality of input ports in accordance with a Media Access Control (MAC) address filter.

21. The method of claim 16, wherein the authenticating the user information comprises:
sending the one or more user credentials to an authentication server; and
receiving an accept message from the authentication server if the one or more user credentials are valid.

22. The method of claim 21, wherein the authentication server comprises a Remote Authentication Dial-In User Service (RADIUS) server.

23. The method of claim 21, wherein the receiving an accept message comprises receiving an accept message that includes the user policy.

24. The method of claim 16, further comprising:
assigning the port to a virtual local area network (VLAN) associated with the one or more user credentials only if the one or more user credentials are valid.

25. The method of claim 24, wherein the assigning the port to a VLAN comprises:
receiving a message from an authentication server, wherein the message comprises a VLAN identifier (ID) associated with the user information; and
assigning the port to a VLAN associated with the VLAN ID.

26. The method of claim 17, further comprising:
if the authenticating of the MAC address indicates the MAC address is invalid,
dropping packets from the user device; or
disabling the port;
if the authenticating user information indicates the user information is valid, determining whether the user is associated with a VLAN supported by the network access device;
if the determining indicates the user is not associated with the VLAN,
assigning the port to a port default VLAN; and
blocking all traffic on the port except for packets related to the user authentication protocol; and
if the determining indicates the user is associated with the VLAN,
assigning the port to the VLAN associated with the user; and
forwarding packets from the user device.

27. The method of claim 16 wherein the user information comprises a user name and a password.

28. The method of claim 16, further comprising:
if the authentication of the user information indicates the user information is invalid, blocking all traffic on the one of the plurality of input ports except for packets related to a user authentication protocol.

29. A network system, comprising:
a network access device comprising a plurality of input ports and configured for packet switching of data packets in a data communications network; and
a user device coupled to a port of the network access device;
wherein the network access device is adapted to:
examine a first data packet comprising a physical address of a user device coupled to one of the plurality of input ports;
authenticate the physical address;
if the authentication of the physical address indicates the physical address is valid, authenticate one or more user credentials provided in a second data packet by a user of the user device after the physical address is authenticated;
if the authentication of the one or more user credentials indicates the one or more user credentials are valid, determine if the network access device has sufficient system resources to dynamically configure a user policy;
if the determination indicates the network access device has sufficient system resources, dynamically assign the user policy to the one of the plurality of input ports; and
restrict further traffic on the one of the plurality of input ports in accordance with the user policy; and
if the authentication of the physical address indicates the physical address is invalid, or if the determination indicates insufficient system resources, block traffic on the one of the plurality of ports except for packets related to a user authentication protocol.

30. The system of claim 29, wherein the physical address comprises a Media Access Control (MAC) address.

31. The system of claim 29, wherein the network access device is adapted to authenticate the user information in accordance with an IEEE 802.1x protocol.

32. The system of claim 29, wherein the user policy identifies an access control list.

33. The system of claim 29, wherein the user policy includes an access control list.

34. The system of claim 29, wherein the user policy identifies a Media Access Control (MAC) address filter.

35. The system of claim 29, wherein the user policy includes a Media Access Control (MAC) address filter.

36. The system of claim 29, further comprising:
an authentication server coupled to the data communications network;
wherein the network access device is adapted to send the one or more user credentials to an authentication server and to receive an accept message from the authentication server if the user information is valid.

37. The system of claim 36, wherein the authentication server comprises a Remote Authentication Dial-In User Service (RADIUS) server.

38. The system of claim 36, wherein the accept message includes the user policy.

39. The system of claim 29, wherein the network access device is further adapted to assign the one of the plurality of input ports to a virtual local area network (VLAN) associated with the one or more user credentials if the one or more user credentials is are valid.

40. The system of claim 39, further comprising:
an authentication server coupled to the data communications network;
wherein the network access device is adapted to receive a message from the authentication server, wherein the message comprises a VLAN identifier (ID) associated with the user information, and to assign the port to a VLAN associated with the VLAN ID if the user information is valid.

41. The network system of claim 30 wherein the network access device is further adapted to:
if authentication of the MAC address indicates the MAC address is invalid,
dropping packets from the user device; or
disabling the port;
if authentication of user information indicates the user information is valid, determine whether the user is associated with a VLAN supported by the network access device;
if the user is not associated with the VLAN,
assign the port to a port default VLAN; and
block all traffic on the port except for packets related to the user authentication protocol; and
if the user is associated with the VLAN,
assign the port to the VLAN associated with the user; and
forward packets from the user device.

42. The system of claim 29 wherein the user information comprises a user name and a password.

43. The system of claim 29 wherein the network access device is further adapted to:
if the authentication of the user information indicates the user information is invalid, block all traffic on the one of the plurality of input ports except for packets related to a user authentication protocol.

44. An apparatus comprising:
a plurality of input ports;
a memory for storing data packets received on the plurality of input ports;
a switching fabric configured for packet switching of the data packets to at least one output port; and
control logic adapted to:
examine a first data packet comprising a physical address of a user device coupled to one of the plurality of input ports;
authenticate the physical address;
drop packets from the user device if the physical address is invalid;
authenticate user information provided in a second data packet by a user of the user device after the physical address is authenticated;
if the authentication of the user information indicates the user information is invalid, block all traffic on the one of the plurality of input ports except for packets related to a user authentication protocol;
if the authentication of the user information indicates the user information is valid, determine whether the user is associated with a VLAN supported by the apparatus by receiving a message from an authentication server, wherein the message comprises a VLAN identifier (ID) associated with the user information;
if the user is not associated with the VLAN,
assign the one of the plurality of input ports to a port default VLAN; and
block all traffic on the one of the plurality of input ports except for packets related to the user authentication protocol; and
if the user is associated with the VLAN and if the apparatus has enough system resources to dynamically configure a user policy associated with the user information,
assign the one of the plurality of ports to the VLAN associated with the user; and
restrict access to the one of the plurality of input ports in accordance with the user policy.

45. The apparatus of claim 44, wherein the apparatus comprises a switch.

46. A computer implemented method for providing network security, the method comprising:
at a network access device comprising a plurality of input ports and configured for packet switching of data packets, examining a first data packet comprising a physical address of a user device coupled to one of the plurality of input ports;
authenticating the physical address;
dropping packets from the user device if the physical address is invalid;
authenticating user information provided in a second data packet by a user of the user device after the physical address is authenticated;
if the authenticating of the user information indicates the user information is invalid, blocking all traffic on the port except for packets related to a user authentication protocol;
if the authenticating of the user information indicates the user information is valid, determining whether the user is associated with a VLAN supported by the network access device by receiving a message from an authentication server, wherein the message comprises a VLAN identifier (ID) associated with the user information;
if the user is not associated with the VLAN,
assigning the one of the plurality of input ports to a port default VLAN; and
blocking all traffic on the one of the plurality of input ports except for packets related to the user authentication protocol; and
if the user is associated with the VLAN and if the network access device has enough system resources to dynamically configure a user policy associated with the user information,
assigning the one of the plurality of ports to the VLAN associated with the user; and
restricting access to the one of the plurality of input ports in accordance with the a user policy.

47. The method of claim 46, wherein the network access device comprises a switch.

48. A network system, comprising:
a network access device comprising a plurality of input ports and configured for packet switching of data packets in a data communications network; and
a user device coupled to a port of the network access device, wherein the network access device is adapted to:
examine a first data packet comprising a physical address of a user device coupled to one of the plurality of input ports;
authenticate the physical address;
drop packets from the user device if the physical address is invalid;
authenticate user information provided in a second data packet by a user of the user device after the physical address is authenticated;
if the authentication of the user information indicates the user information is invalid, block all traffic on the port except for packets related to a user authentication protocol;

if the authentication of the user information indicates the
user information is valid, determine whether the user is
associated with a VLAN supported by the network
access device by receiving a message from an authentication server, wherein the message comprises a VLAN
identifier (ID) associated with the user information;

if the user is not associated with the VLAN,
    assign the one of the plurality of input ports to a port
default VLAN; and
    block all traffic on the one of the plurality of input ports
except for packets related to the user authentication
protocol; and if the user is associated with the VLAN and if the network
access device has enough system resources to dynamically configure a user policy associated with the user
information,
    assign the one of the plurality of ports to the VLAN
associated with the user; and
    restrict access to the one of the plurality of input ports in
accordance with the a user policy.

49. The network system of claim 48, wherein the network access device comprises a switch.

* * * * *